United States Patent Office 3,117,841
Patented Jan. 14, 1964

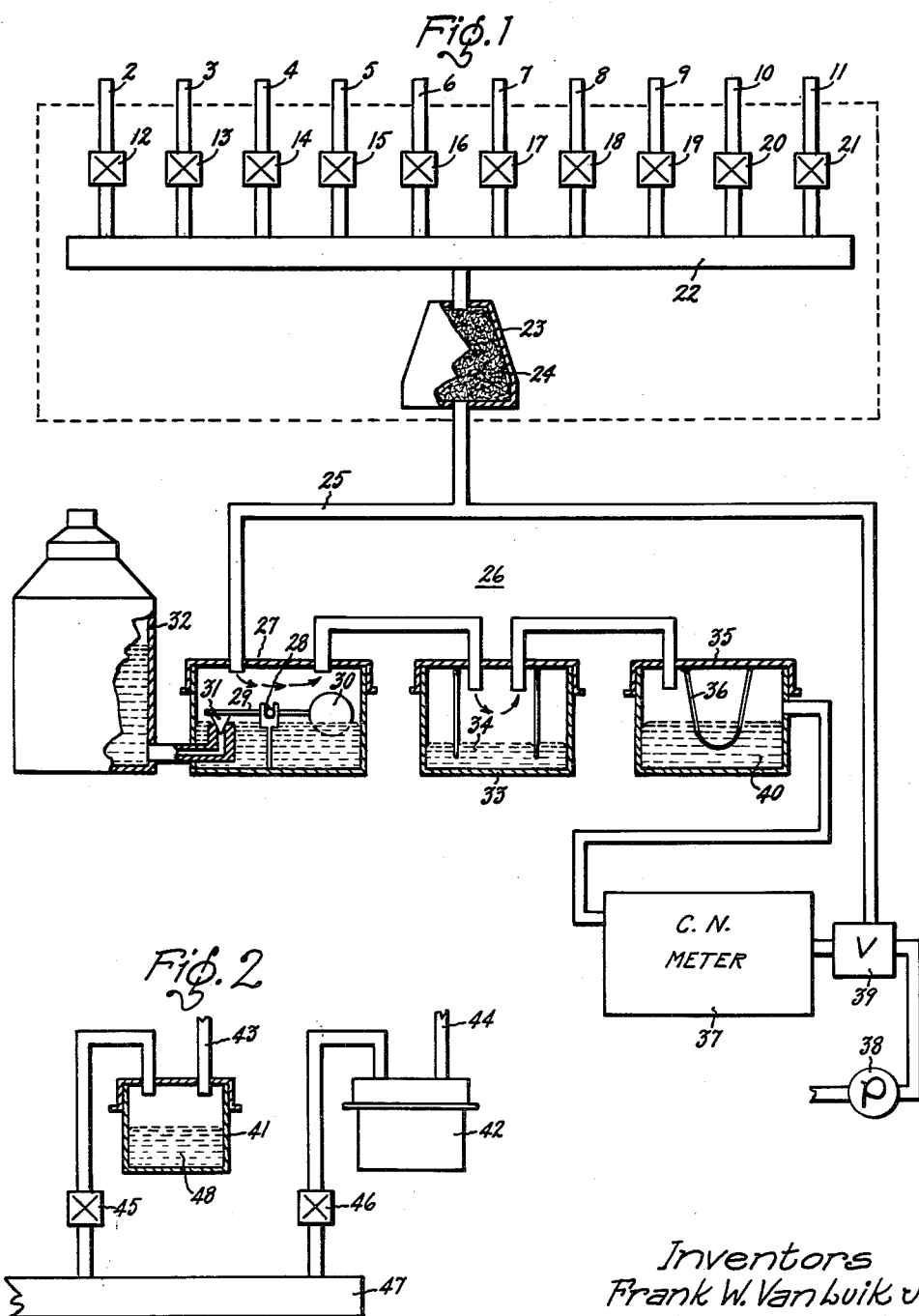

3,117,841
METHOD AND APPARATUS FOR DETECTING GASES OR VAPORS
Frank W. Van Luik, Jr., and Stuart B. Dunham, Schenectady, N.Y., assignors to General Electric Company, a corporation of New York
Filed Sept. 30, 1960, Ser. No. 59,584
16 Claims. (Cl. 23—232)

This invention relates to a method and apparatus for detecting and measuring extremely minute quantities of gases and vapors. More particularly, this invention relates to a method and apparatus for measuring and detecting gases and vapors by means of a condensation nuclei technique.

For many reasons, only two of which are toxicity and inflammability hazards, it is desirable to detect the presence and measure the condensation of many organic and inorganic compounds which exist as gases and vapors in the atmosphere. By compounds which exist as gases and vapors in the atmosphere it is meant to include those substances which, although having boiling points somewhat above room temperature, still have sufficient volatility at usual ambient conditions to give off problemsome quantities of vapor. For example, red fuming nitric acid and sulfur trioxide are but two substances which give off fumes that are both toxic and extremely corrosive. Another class of compounds which are desirable to detect are certain nitrogenous compounds which include unsymmetrical dimethyl hydrazine

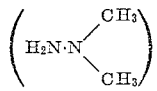

monoethylamine ($NH_2 \cdot C_2H_5$), diethylamine

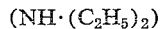

triethylamine ($N \cdot (C_2H_5)_3$), and ammonia ($NH_3$). All of the nitrogenous compounds mentioned, excepting ammonia, can be classified as inflammability hazards if present in the atmosphere in more than trace quantities. Although methods and devices are known for detecting and measuring such foreign gases and vapors in the atmosphere, these prior art methods and devices lack the accuracy and sensitivity to detect very low gas and vapor concentrations in the order of parts per million.

It has been found that extremely low concentrations of these gases and vapors may be detected and measured by converting the vapors and gases to airborne particulates which have such physical characteristics that they can act as condensation nuclei.

The term "condensation nuclei" as utilized in this application is a generic term given to small airborne particles which are characterized by the fact that they will serve as the nucleus on which a fluid such as water, for example, will condense to form droplets. Such condensation nuclei encompass particles lying in a size range extending slightly above molecular size, or $1 \times 10^{-8}$ centimeter radius, to $1 \times 10^{-5}$ centimeter radius, although the most important portion of the spectrum lies from $5 \times 10^{-5}$ centimeter radius to $1 \times 10^{-7}$ centimeter radius.

It is, therefore, an object of this invention to provide a method and apparatus for detecting minute traces of gas or vapor by converting these gases and vapors to airborne particulates.

Another object of this invention is to provide methods and apparatus for detecting minute quantities of gases and vapors by converting these gases and vapors to airborne particulates of significantly different diameters.

Other objects and advantages of this invention will become apparent as the description of this invention proceeds.

Briefly, the invention is practised by converting the gases and vapors to be detected into nucleogenic particles which have low vapor pressure so that at atmospheric pressure the nucleogenic particles are in a solid or liquid form. More specifically, the method of the invention comprises reacting the vapor with an aqueous medium selected from the group consisting of water and aqueous solutions of a volatile reactant to form nucleogenic particles from the vapor, reducing the pressure on the gas stream whereby water condenses on the nucleogenic particles and measuring the concentration of the particles in the gas stream. One mechanism for achieving this conversion of the gases and vapors is by an acid-base chemical reaction, by means of which the vapors of an acid compound to be detected are reacted with vapors of a volatile base in aqueous solution to form a salt which has the required low vapor pressure. Another mechanism utilizable for the detection of the red fuming nitric acid and sulfur trioxide type vapors is direct hydrolization by the absorption of water vapor. The hydrolysis reaction forms a meta-stable molecule of the vapor to be detected with water vapor, the product leaving a vapor pressure such that under ambient conditions of pressure and temperature, molecular aggregates are formed which are nucleogenic and hence are capable of acting as condensation nuclei. The size of the nucleogenic aggregates formed by the direct hydrolysis mechanism are much smaller than particles formed by the acid-base mechanism having radii of the order of $10^{-7}$ cm. or less compared to an average radii of $5 \times 10^{-7}$ cm. for the latter particles. There are certain advantages gained by use of the smaller radii particles in the detection of vapors by the present method, including less critical need for screening out dust and other nucleogenic particles normally present in the incoming gas stream to be monitored and reduced background effect during measurement with the type nuclei meter hereinafter described. Other advantages in the preparation of the smaller nuclei by the hydrolysis mechanism are elimination of the volatile reactant and simpler operational procedure for the conversion.

The features of this invention which are believed to be novel are set forth with particularity in the appended claims. The invention itself, however, both as to its organization and method of operation together with further objects and advantages thereof may best be understood by reference to the following description taken in connection with the accompanying drawings, in which FIGURE 1 is a schematic illustration of a device for detecting and measuring the gases or vapors; and, FIGURE 2 is a fragmentary showing of an alternative construction of the device of FIGURE 1;

By the way of an example, to illustrate the use of the apparatus of FIGURE 1 in the detection of an acid such as red fuming nitric acid by the acid-base conversion mechanism, it has been found that conversion takes place and airborne particulates are formed if the red fuming nitric acid is passed over a water solution of ammonia containing 10% or less by volume of ammonium hydroxide ($NH_4OH$). The red fuming nitric acid in passing over the ammonia solution undergoes the following reaction:

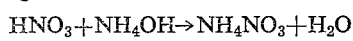

The compound $NH_4NO_3$ is a nucleogenic material in that its vapor pressure is such that it exists as an airborne particulate which may be detected by standard condensation nuclei measuring techniques. In detecting gases and vapors which are nitrogenous bases, such as the amines referred to previously, the base to be detected is passed over a water solution of a suitable acid to form the requisite airborne particulate. In the case of unsymmetrical dimethyl hydrazine, which is exemplary of this class of nitrogenous bases, the gas stream containing the unsymmetrical dimethyl hydrazine (which for convenience will hereinafter be referred to by the contraction UDMH) is passed over a water solution of nitric acid containing from 5–60% by volume of the nitric acid ($HNO_3$). It has been found, however, that a 15% solution by volume of the nitric acid in the water is perfectly adequate in detecting the UDMH. The action responsible for the formation of the airborne particulates from the UDMH is not fully understood as yet. However, it is believed that a low vapor pressure salt is formed, most likely one which is a complex hydrazine nitrate formed by the reaction of the UDMH with the nitric acid.

FIGURE 1 illustrates a preferred embodiment of an instrumentality constructed in accordance with the invention for detecting and measuring selected gases and vapors by means of an acid-base reaction. The instrumentality of FIGURE 1 is one which is adapted to sample the air in a number of scattered areas to provide a remote monitoring and detecting system of great flexibility. To this end, air samples are drawn from the areas to be monitored through a plurality of conduits 2, 3, 4 . . . 11, etc. and supplied to a conversion unit presently to be described. Passage of the air samples through the conduits 2, 3, etc. is controlled by means of solenoid operated valves 12–21 which are energized in a predetermined time sequence to connect the individual conduits to a manifold 22 and hence to the conversion unit. Any suitable timing circuit, such as a plurality of cam operated micro-switches for selectively and sequentially energizing the individual solenoid valves may be utilized. Many such timing circuits are within the grasp of one skilled in the art. However, one circuit which may be used is illustrated and described in U.S. Patent No. 2,897,059, F. W. Van Luik, Jr., entitled "Process and Apparatus for Gas Detection," issued July 28, 1959.

The air samples flow through manifold 22 and then through a filter element 23 which is filled with fibrous material 24, such as fibre glass for example, to remove all ambient airborne particulates in the sample gases. It will be appreciated that to achieve the maximum sensitivity and accuracy, all ambient condensation nuclei should be removed so that only those condensation nuclei produced by conversion of gases or vapors are measured. The nuclei free gas samples then flow through outlet conduit 25 to a conversion unit illustrated generally at 26 where the gases and vapors are converted by means of an acid base reaction to the airborne condensation nuclei.

The converter unit 26 includes a humidifying chamber 27 where the air sample containing the vapors and gases are humidified by passing them over a water surface where it picks up water vapor. The humidifier 27 comprises a water tight container and includes a float valve 28 which controls the level of the water in the container. The float valve 28 includes a pivoted float arm 29 having a ball float 30 at one end and a valve element 31 for controlling the water supply at the other. The float control valve operates in the usual fashion to control the water level in the humidifying unit 27 by controlling the position of valve 31 as the ball float 30 moves with the water level. Valve element 31 controls the admission of water from water supply tank 32 into the chamber.

The humidified air sample passes into converter chamber 33 which contains a suitable solution 34 which reacts with the gas or vapor in the air stream. Thus if an acid such as fuming red nitric acid is being detected, the solution 34 in the converter is a 10% or less by volume water solution of ammonia. If the gas or vapor to be detected is a basic material, such as the various amines or ammonia enumerated previously, the solution 34 is an acid solution and preferably a 15% by volume water solution of nitric acid. The gases or vapors in passing through the chamber 33 react in the manner described previously to form low vapor pressure salts which leave the chamber in the form of airborne submicroscopic particulates of the type which are capable of acting as condensation nuclei.

The particles bearing airstream is brought into a second humidifying chamber 35 wherein the nuclei bearing air samples are brought to 100% relative humidity. A water absorbent material 36 such as cheesecloth is fastened to the upper wall of chamber 35 and extends into a pool of water 40. The air passing through and around this material absorbs water vapor and is thus brought to 100% relative humidity. It will be appreciated that under some conditions and circumstances one of the two humidifying devices 27 and 35 may be dispensed with as long as it is understood that at some point the particle bearing air samples are brought to 100% relative humidity.

The humidified particle bearing sample is then brought to a condensation nuclei measuring device illustrated generally at 37 which detects and measures the particle concentration by condensing the water vapor about the particles. The manner in which this may be achieved is by bringing the humidified nuclei bearing samples into a chamber and adiabatically expanding the sample. The expansion cools the samples so that the samples which were at 100% relative humidity before become supersaturated by an amount depending on the degree of expansion. This adiabatic expansion is achieved by subjecting the samples to a controlled pressure drop by means of the pump 38 and the pressure control valve 39. Since the super-saturated condition is in unstable one, the system tends to return to a stable condition by the condensation of excess water vapor about the airborne particles which now act as nuclei for the condensation of excess vapor. The condensation of water about these particles causes them to grow in size by many orders of magnitude so that a cloud of droplets is formed within the device 37. By means of an electro-optical system the density of this droplet cloud, and hence the concentration of the particles in the air, is determined. A detailed description of such a condensation nuclei measuring device is described in Patent No. 2,684,008, issued July 20, 1954, to Bernard Vonnegut, and assigned to the General Electric Co., the assignee of the present invention.

The electrical output signal from the condensation nuclei measuring device 37 may be utilized to provide a direct indication of the particle concentration on a meter, or may be used to drive the marking element, such as a pen of a recording device. Alternatively, the output from the measuring device may be utilized to actuate an alarm circuit if the gas or vapor content, as represented by the particle concentration after conversion, exceeds a preset value.

The instrument described above and illustrated in FIGURE 1 measures the gas or vapor concentration, in parts per million, by measuring the particle concentration, in parts per cubic centimeter, produced by the acid-base reaction. It is therefore necessary to calibrate the particle measuring instruments so that an indication produced thereby may be calibrated directly in parts per million of the gas or vapor. To this end, the following calibration scheme was utilized and constitutes a satisfactory approach. A sealed room having a volume of $6.4 \times 10^7$ cc. was provided. Three large fans are positioned in the room to assure proper mixing of the air in the room and an exhaust fan is provided to clear the room initially of any vapor contained therein. A sample of red fuming nitric acid, UDMH, or any of the other vapors to be detected is introduced into the room through a port by means of a graduated hypodermic needle which discharges a fixed quantity of the material onto a clean glass plate within the room. The plate is then heated slightly so that all of the vapor evaporates into the room air within one minute. A converter unit, such as that of FIGURE 1, is coupled to the sealed room by means of a suitable conduit so that samples of room air are supplied to the converter unit and the particle concentration measured.

The amount of the red fuming nitric acid, UDMH, or other vapor to be detected which is introduced in the room in order to produce a given concentration C in parts per million is determined from the following relationship for the mass or vapor concentration on a volume per volume basis for air at 760 mm. of mercury at 25° C:

$$C = \frac{\text{mol. weight of vapor}}{2.445 \times 10^4} (M_W) \quad (1)$$

where the molecular weight is in milligrams per liter of a gas or vapor. The molecular weight $M_W$ for red fuming nitric acid is taken to be 63. This is actually the formula weight of concentrated nitric acid and hence introduces somewhat of an error into the calculation since it does not take into account the fact that red fuming nitric acid is a mixture to which a strict molecular weight does not apply. However, the error introduced by utilizing a molecular weight of 63 for red fuming nitric acid is relatively minor and does not affect the calculation to an appreciable extent. According to Equation 1 above, one part per million of red fuming nitric acid vapor requires $$2.58 \times 10^{-3}$$

milligrams per liter of air. Liquid fuming nitric acid has a specific density of 1.64 so that evaporation of 1 milligram of the liquid injected into a room with a volume of $6.4 \times 10^4$ liters (i.e. $6.4 \times 10^7$ cc.) produces $2.48 \times 10^{-2}$ milligrams per liter. Dividing into $2.58 \times 10^{-3}$ milligrams per liter (the quantity necessary to obtain one part per million of red fuming nitric acid vapor) indicates that 0.104 milligram of liquid red fuming nitric acid is required to produce one part per million of red fuming nitric acid vapor in the chamber.

In a similar manner the quantity in milligram of UDMH, which must first be injected into chamber to produce one part per million of UDMH, which has a molecular weight of 60.08, may be calculated and will be found to be 0.204 milligrams of liquid UDMH. After calculating the required quantities which must be injected into the sealed volume to produce the requisite parts per million concentration, requisite amounts of the liquid were injected and an indication of the particle concentration produced obtained and the device calibrated directed in terms of parts per million. In this fashion each of the instrumentalities may be directly calibrated by inserting controlled gas or vapor concentration into the room and ascertaining the deflection or indication on the measuring instrumentality.

In the previous discussion it has been shown that various gases and vapors may be detected by subjecting these gases and vapors to an acid base reaction to form airborne particulates which may then be measured to produce an indication of the gas or vapor concentration. It has also been shown, that for many reasons, it may be desirable to utilize an instrumentality embodying the invention to monitor a plurality of scattered relatively remote areas by selectively drawing air samples from these areas through a plurality of conduits to the remotely located detector assemblies. It has been found, however, that where extremely low vapor or gas concentrations are to be measured, difficulty may be encountered by virtue of partial ab- and adsorption of the gases and vapors in the conduits, valves, and the remaining instrumentalities. This problem is particularly acute where extremely low concentrations of UDMH are to be measured since the vapor was found to absorb to a relatively large extent on the conduits, etc. To avoid this difficulty, the converter units illustrated at 41 and 42 are connected to the inlet conduits 43 and 44 ahead of the periodically operated solenoid valves 45 and 46 and also ahead of the manifold 47. Converters 41 and 42 are similar to the one described with respect to FIGURE 1 and contain a solution which reacts with the gas or vapor in the air stream to produce the particulate forming acid-base reaction. Thus, the liquid 48 in converter 41 would be a 15% by volume aqueous nitric acid solution for the detection of UDMH or other bases. By thus introducing the conversion unit near the entrance of the inlet conduit, the vapor or gas is immediately converted to the particulate form and is conducted to the condensation nuclei particle measuring device such as the one described with reference to FIGURE 1. In such a case, the filter material 24 is chosen to remove ambient particles with an average size in the order of $4 \times 10^{-6}$ cm. radius, but pass the particles produced in chamber 41 which are $5 \times 10^{-7}$ cm. in radius. In this manner, the absorption of the vapor or gas in the conduit is minimized and the sensitivity of the device is optimized.

The device of FIGURE 1 preferably employed for the detection and measurement of vapors by conversion to airborne particles through an acid-base mechanism can also be employed with but slight modification to convert a vapor to be detected to airborne particles by a hydrolysis type mechanism. More specifically, if the converter chamber 33 and the second humidifying chamber 35 are removed from the device shown in FIGURE 1 and the apparatus operated as hereinbefore described, the humidifying chamber 27 of the modified apparatus will now function as a converter unit for the hydrolysis reaction. To further illustrate the operation of the modified device of FIGURE 1 to measure red fuming nitric acid by means of a hydrolysis conversion, air samples containing the acid enter the device from manifold 22 and pass through filter 23 into the converter 27. In passing over the surface of the water contained in this chamber, the samples absorb water vapor present in the chamber air space, causing the red fuming nitric acid vapor present in the chamber air space to hydrolyze and form airborne particles. The hydrolysis reaction forms a metastable molecule of nitrogen dioxide ($NO_2$) and water vapor ($H_2O$) which has a vapor pressure such that under ambient conditions of pressure and temperature, molecular aggregates are formed which are nucleogenic and hence are capable of acting as condensation nuclei. The nucleogenic agglomerates thus formed are very minute in size and have radii of the order of $10^{-7}$ cm. or less.

In order to detect particles of this size (i.e. $r \leq 10^{-7}$ cm.), condensation nuclei measuring techniques such as those already described for the measurement of particles formed by the acid-base mechanism are employed. The particles are brought into the condensation nuclei measuring device illustrated generally at 37 wherein the samples are humidified to bring them to 100% relative humidity and then expanded adiabatically. The adiabatic expansion cools the samples so that these samples which were at 100% relative humidity become supersaturated by an amount depending on the degree of expansion. The means for adiabatic expansion of the samples, the measurement of the droplets formed thereby, and the calibration of the particle measuring instruments (nuclei meter 37) are all accomplished as described above for the acid-base mechanism embodiment.

The degree of adiabatic expansion to which the samples must be subjected is determined by the particle size. That is, the smaller the particle, the greater the supersaturation required in order to condense water vapor about the particles. The degree of supersaturation is in turn controlled by the pressure differential to which the sample is subjected. Reference is hereby made to an article by S. K. Ghosh and N. N. Das Gupta, "Review of Modern Physics," vol. 18, April 1946, which defines the relationship between particulate size, degree of supersaturation, and expansion ratio necessary to produce condensation about such nucleogenic particles.

From the foregoing description, it will be apparent that a method and apparatus for detecting and measuring extremely low concentrations of various vapors and gases have been provided. Furthermore, this novel method and apparatus, which are based on converting the gas or vapor to airborne particulates by direct reaction with an aqueous medium provides sensitivities, response time, and an electrical output signal such as have not been possible or practical with prior art gas detecting devices. Although not desiring to limit the invention to specific response times and sensitivities of measurement, the novel features of the invention can be illustrated by certain results obtained with the preferred embodiments above shown. For example, it has been possible to detect less than one p.p.m. of UDMH in the atmosphere by means of conversion employing a nitric acid solution within two seconds after sampling. Likewise, concentrations of 1.0 p.p.m. of red fuming nitric acid and 0.1 p.p.m. of ammonia were detected in the atmosphere by acid-base conversion means within a response time of two seconds after sampling. The initial detection of 0.5 p.p.m. of red fuming nitric acid by hydrolysis conversion means was also made within two seconds after sampling. The response times indicated measure the time interval between receipt of the sample atmosphere to the conversion chamber 27 and a detection reading on the C.N. meter 37. It will be obvious that the total response time, which includes sampling time as well as the period for conversion and detection of the vapor, will be dependent upon such design features of the apparatus as length of sampling tubing, extent of means for removal of ambient airborne particles in the gas sample, etc. With the particular experimental device employed for the above reported measurements, total response time for detection was generally within 30 seconds.

The selection of the voltage compound for reaction with the vapor to be detected to form nucleogenic particles according to a preferred embodiment of the invention is not believed critical since, as has been shown above, nucleogenic particles were formed merely by passage of red fuming nitric acid vapor over water. Suitable compounds can be selected from the broad class of water-soluble organic and inorganic substances which exert sufficient vapor pressure at ordinary ambient conditions to react with the vapor to be detected merely by passage of a gas stream containing the vapor over an aqueous solution of the compound to form a reaction product which exists as solid or liquid nucleogenic particles at such ordinary ambient conditions. Although suitable volatile reactants can best be characterized by the above properties, it is to be understood that the method of the invention is not to be limited to conversion of the vapor to nucleogenic particles by passage of the vapor in a gas stream over the aqueous medium. More specifically, even though the preferred method shown above employs the practice of passing a gas stream containing the vapor to be detected over the aqueous medium in order to convert the vapor to nucleogenic particles, it will be obvious that conversion of the vapor will also be achieved by bubbling the gas stream through the aqueous medium or employing other known techniques for gas-liquid type reactions.

While particular embodiments of this invention have been shown, it will, of course, be understood that the invention is not limited thereto since many modifications, both in circuit arrangement and in the instrumentalities employed, may be made. It is contemplated by the appended claims to cover any such modifications as fall within the true spirit and scope of this invention.

What we claim as new and desire to secure by Letters Patent of the United States is:

1. The method of detecting a nitrogen base vapor in a gas stream which comprises removing ambient airborne particulates, reacting the nitrogen base vapor by contact with an aqueous reactive acid vapor to form nucleogenic salt particles from the vapor, reducing the pressure on the gas stream whereby water vapor condenses on the nucleogenic particles, and measuring the concentration of the nucleogenic particles in the gas stream.

2. The method of detecting a hydrolyzable acid vapor in a gas stream which comprises removing ambient airborne particles, reacting the acid vapor by contact with water vapor to form nucleogenic acid particles from the vapor, bringing the gas stream with the nucleogenic particles to a condition of 100% relative humidity, reducing the pressure on the gas stream whereby water vapor condenses on the nucleogenic particles, and measuring the concentration of the nucleogenic particles in the gas stream.

3. The method of detecting a hydrolyzable acid vapor in a gas stream which comprises removing ambient airborne particles, passing the gas stream containing the vapor over a water surface to humidify and hydrolyze the acid vapor thereby forming nucleogenic particles of hydrolyzed acid, bringing the gas stream with the nucleogenic particles to a condition of 100% relative humidity, reducing the pressure on the gas stream whereby water vapor condenses on the nucleogenic particles, and measuring the concentration of the nucleogenic particles in the gas stream.

4. The method of detecting an acid vapor in a gas stream which comprises reacting the vapor by passage of the gas stream over an aqueous solution of a reactive base to form nucleogenic salt particles in the vapor, reducing the pressure on the gas stream whereby water vapor condenses on the nucleogenic particles, and measuring the concentration of the nucleogenic particles.

5. The method of detecting traces of vapor in a sample atmosphere which comprises converting the vapor by an acid base reaction to a salt which has a low vapor pressure through contact of the vapor with a humidified atmosphere containing a reactive salt-forming vapor, bringing the sample atmosphere with the salt to a condition of 100% relative humidity, and reducing the pressure on the sample atmosphere whereby water vapor condenses on the salt particulates to form a cloud of droplets, and determining the density of the cloud of droplets.

6. The method of detecting traces of vapor in a sample atmosphere comprising removing ambient airborne particulates, converting the vapor by an acid-base reaction to a salt which has a low vapor pressure through contact of the vapor with a humidified atmosphere containing a reactive salt-forming vapor, bringing the sample atmosphere with the salt converted vapor to a condition of 100% relative humidity, reducing the pressure on the sample atmosphere whereby water vapor condenses on the gas-salt to form a cloud of droplets, and determining the density of the cloud of droplets.

7. The method of detecting traces of vapor in a sample atmosphere comprising removing ambient airborne particulates, passing the atmosphere containing the vapor over a water surface to humidify the vapor, converting the humidified vapor by acid-base reaction to a low pressure salt through contact of the humidified vapor with a humidified atmosphere containing a reactive salt-forming vapor, bringing the sample atmosphere to a condition of 100% relative humidity, reducing the pressure on the sample atmosphere whereby water vapor condenses on the particulates to form a cloud of droplets, and determining the density of the cloud of droplets.

8. In a method for detecting red fuming nitric acid vapors, the steps comprising reacting fuming nitric acid vapor with water vapor to form nucleogenic particles from said acid vapor, reducing the pressure on the vapor to obtain a degree of supersaturation sufficient to produce condensation of water vapor around the particles, and detecting the concentration of the particles by said reaction to provide a measure of the acid vapor concentration.

9. The method of detecting red fuming nitric acid vapors from a gas stream which comprises removing ambient airborne particulates from the stream, passing the stream over water to react any fuming nitric acid vapor with water vapor to form nucleogenic particles from the acid vapor, reducing the pressure on the stream to obtain a degree of supersaturation sufficient to produce condensation of water vapor about the particles, and measuring the concentration of the particles in the stream.

10. The method of detecting red fuming nitric acid vapors in a gas stream which comprises removing ambient airborne particulates from the stream, reacting the vapors with an aqueous ammonia solution to form nucleogenic particles of ammonium nitrate in the gas stream, bringing the gas stream containing the nucleogenic particles to a condition of 100% relative humidity, and reducing the pressure on the gas stream whereby water vapor condenses on the nucleogenic particles, and measuring the concentration of the nucleogenic particles in the gas stream.

11. The method of detecting unsymmetrical dimethyl hydrazine vapors in a gas stream which comprises removing ambient airborne particulates from the stream, reacting the vapors with an aqueous nitric acid solution to form nucleogenic particles of hydrazine nitrate complex, bringing the gas stream containing the nucleogenic particles to a condition of 100% relative humidity, and reducing the pressure on the gas stream whereby water vapor condenses on the nucleogenic particles, and measuring the concentration of the nucleogenic particles in the gas stream.

12. An apparatus for detecting traces of vapor in a sample atmosphere comprising in combination filtering means to remove airborne particulates from the atmosphere, a first enclosed chamber for humidifying the sample atmosphere, a second enclosed chamber containing a liquid medium and having means for passing the sample atmosphere in contact with the liquid medium to form nucleogenic particles in the sample atmosphere, a third enclosed chamber having means for reducing the pressure on the sample atmosphere so that water vapor condenses on the nucleogenic particles, and optical means for measuring the concentration of the nucleogenic particles in the sample atmosphere.

13. An apparatus for detecting traces of vapor in a sample atmosphere comprising in combination filtering means to remove airborne particulates from the atmosphere, a first enclosed chamber for humidifying the sample atmosphere, a second enclosed chamber containing a liquid medium and having means for passing the sample atmosphere in contact with the liquid medium to form nucleogenic particles in the sample atmosphere, a third enclosed chamber having means for humidifying the nucleogenic particles in the sample atmosphere, a fourth enclosed chamber having means for reducing the pressure on the sample atmosphere so that water vapor condenses on the nucleogenic particles, and optical means for measuring the concentration of the nucleogenic particles in the sample atmosphere.

14. An apparatus for detecting traces of vapor in a sample atmosphere comprising in combination filtering means to remove airborne particulates from the atmosphere, a first enclosed chamber for humidifying the sample atmosphere, a second enclosed chamber containing a liquid medium and having means for passing the sample atmosphere in contact with the liquid medium to form nucleogenic particles in the sample atmosphere, a third enclosed chamber having means for humidifying the nucleogenic particles in the sample atmosphere, a fourth enclosed chamber having means for reducing the pressure on the sample atmosphere so that water vapor condenses on the nucleogenic particles, said chambers being associated by interconnecting gas passage means, and optical means for measuring the concentration of nucleogenic particles in the sample atmosphere.

15. An apparatus for detecting traces of vapor in a sample atmosphere comprising in combination filtering means to remove airborne particulates from the atmosphere, a first enclosed chamber for humidifying the sample atmosphere, a second enclosed chamber containing a pool of liquid medium having means for passing the sample atmosphere in contact with the surface of the liquid pool to form nucleogenic particles in the sample atmosphere, a third enclosed chamber having means for reducing the pressure on the sample atmosphere so that water vapor condenses on the nucleogenic particles, and optical means for measuring the concentration of the nucleogenic particles in the sample atmosphere.

16. An apparatus for detecting traces of vapor in a sample atmosphere comprising in combination filtering means to remove airborne particulates from the atmosphere, a first enclosed chamber for humidifying the sample atmosphere, a second enclosed chamber containing a pool of liquid medium having means for passing the sample atmosphere in contact with the surface of the liquid pool to form nucleogenic particles in the sample atmosphere, a third enclosed chamber having means for humidifying nucleogenic particles in the sample atmosphere to bring the nucleogenic particles to a condition of 100 percent relative humidity, a fourth enclosed chamber for adiabatically expanding the sample atmosphere to produce supersaturation and condense water vapor on the nucleogenic particles thereby forming a cloud of droplets in the sample atmosphere, said chambers being interconnected by gas passage means, and optical means for determining the density of the cloud of droplets.

References Cited in the file of this patent

UNITED STATES PATENTS

| | | |
|---|---|---|
| 2,136,741 | Henne | Nov. 15, 1938 |
| 2,684,008 | Vonnegut | July 20, 1954 |
| 2,774,652 | Vonnegut | Dec. 18, 1956 |
| 2,791,901 | Rich | May 14, 1957 |
| 2,897,059 | Van Luik | July 28, 1959 |
| 2,915,939 | Van Luik | Dec. 8, 1959 |
| 2,956,435 | Rich | Oct. 18, 1960 |
| 3,010,308 | Skala | Nov. 28, 1961 |